Figure 1:
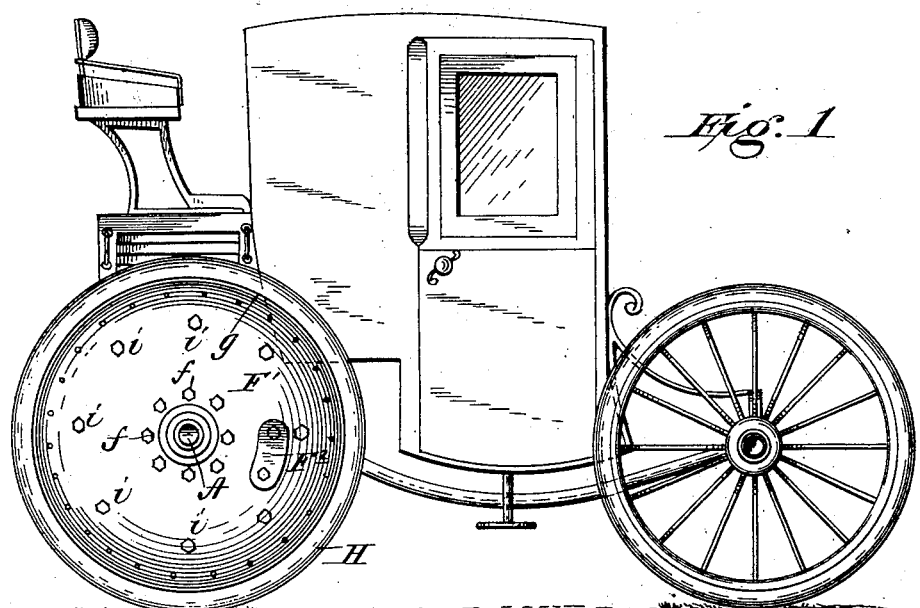

No. 643,854. Patented Feb. 20, 1900.
J. T. WHITTLESEY.
ELECTRIC MOTOR WHEEL.
(Application filed June 26, 1899.)

(No Model.) 4 Sheets—Sheet 1.

Witnesses
Franck L. Ourand.
Grace P. Brereton.

Inventor
James T. Whittlesey
By Geo. T. Whittlesey
Attorney

No. 643,854. Patented Feb. 20, 1900.
J. T. WHITTLESEY.
ELECTRIC MOTOR WHEEL.
(Application filed June 26, 1899.)
(No Model.) 4 Sheets—Sheet 2.

Witnesses
Franck L. Ourand
Grace P. Bureton

Inventor
James T. Whittlesey
By Geo. H. Whittlesey
Attorney

No. 643,854. Patented Feb. 20, 1900.
J. T. WHITTLESEY.
ELECTRIC MOTOR WHEEL.
(Application filed June 26, 1899.)

(No Model.) 4 Sheets—Sheet 3.

No. 643,854. Patented Feb. 20, 1900.
J. T. WHITTLESEY.
ELECTRIC MOTOR WHEEL.
(Application filed June 26, 1899.)
(No Model.) 4 Sheets—Sheet 4.

Witnesses
Franck L. Ourand.
Grace P. Brereton

Inventor
James T. Whittlesey
By Geo. P. Whittlesey
Attorney

THE NORRIS PETERS CO., PHOTO-LITHO., WASHINGTON, D. C.

UNITED STATES PATENT OFFICE.

JAMES THOMAS WHITTLESEY, OF ELIZABETH, NEW JERSEY.

ELECTRIC-MOTOR WHEEL.

SPECIFICATION forming part of Letters Patent No. 643,854, dated February 20, 1900.

Application filed June 26, 1899. Serial No. 721,955. (No model.)

*To all whom it may concern:*

Be it known that I, JAMES THOMAS WHITTLESEY, a citizen of the United States, residing at Elizabeth, in the county of Union and State of New Jersey, have invented certain new and useful Improvements in Electric-Motor Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to electric motors for vehicles; and its object is to provide an improved motor-wheel, or, in other words, a motor-wheel which at the same time constitutes a wheel for the vehicle. Such a device is not broadly new, several patents having been heretofore granted for a car-wheel which embodies a motor or for a motor having one of its reacting electrodynamic elements (field-magnets and armatures) attached directly to the wheel or to a rotating axle to which the wheel is secured. My improvements aim to make such a device lighter and more compact and efficient. I accomplish this in part by utilizing the web of the wheel between the hub and the rim as a portion of the magnetic circuit, thereby reducing the weight of the field-magnets and saving the space which would otherwise be occupied by them. My improvements also aim to provide means for maintaining a constant air-gap between the field-poles and the armature and for adjusting this gap when necessary.

The motor-wheel embodying my invention is a strong rigid structure capable of resisting side thrusts and twisting strains. As a motor it has great starting torque and gives good efficiency with a current of comparatively-low voltage. It is therefore especially available for automobiles deriving power from storage or primary batteries. In such vehicles it enables the center of gravity to be placed at a lower point than usual, since the space beneath the body ordinarily used for the motors is available for the body and the battery-chambers. A drop-axle can be used if it is desired to carry the weight at a still-lower level. This lowering of the car or vehicle body is one of the chief advantages to be gained by my invention and one point in which the design of the French vehicles is superior to the American. Furthermore, in electric automobiles it is customary to use a small motor hung on the axle in order to economize weight and space; but a small motor must be run at a high speed in order to develop the proper counter electromotive force, and this requires speed-reducing gearing between the motor and the driving-wheels of the vehicle. Such gearing is generally noisy, owing to the necessity of using an open form of tooth and the very considerable wear that soon takes place. The efficiency decreases very fast, also, with the rapid wear of the gears. By my invention I avoid all this trouble, since my motor-wheel is gearless, and therefore noiseless, and in addition will maintain its designed efficiency, as there are no gears to wear and increase the friction.

One of the great difficulties with the present power for driving vehicles is the torsional strains developed in the wheels. This design eliminates these strains by applying the forces (by means of the reaction between the armature and field) at the wheel-tire and not at the hub or spokes.

Another advantage of my motor-wheel is its capacity for use as an electric brake. It has a distinct advantage over the small high-speed motor, whose armature is light and of too small a diameter to be serviceable in braking. The strains are too great, also, on the small gears, while in my design the retardation is all out close to the wheel-rim and no strains are transmitted through the hub of the wheel or spokes.

Figure 4:
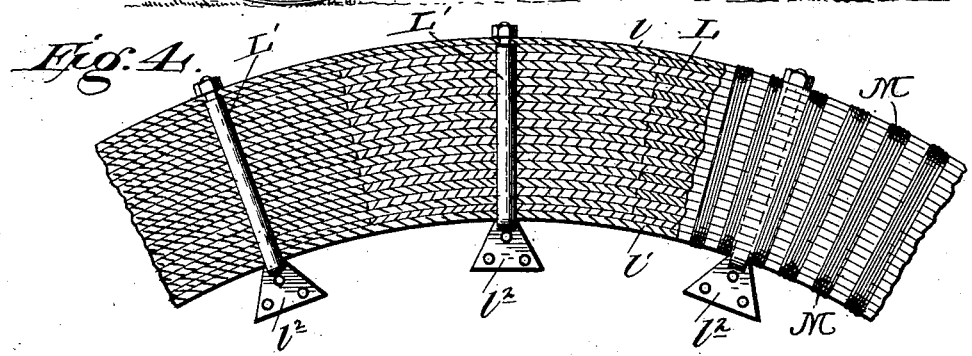
Figure 5:
Figure 6:
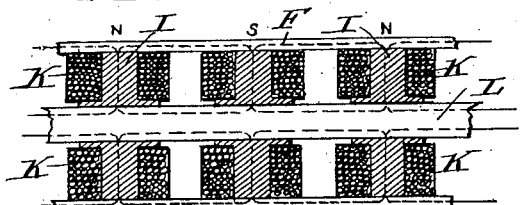
Figure 2:
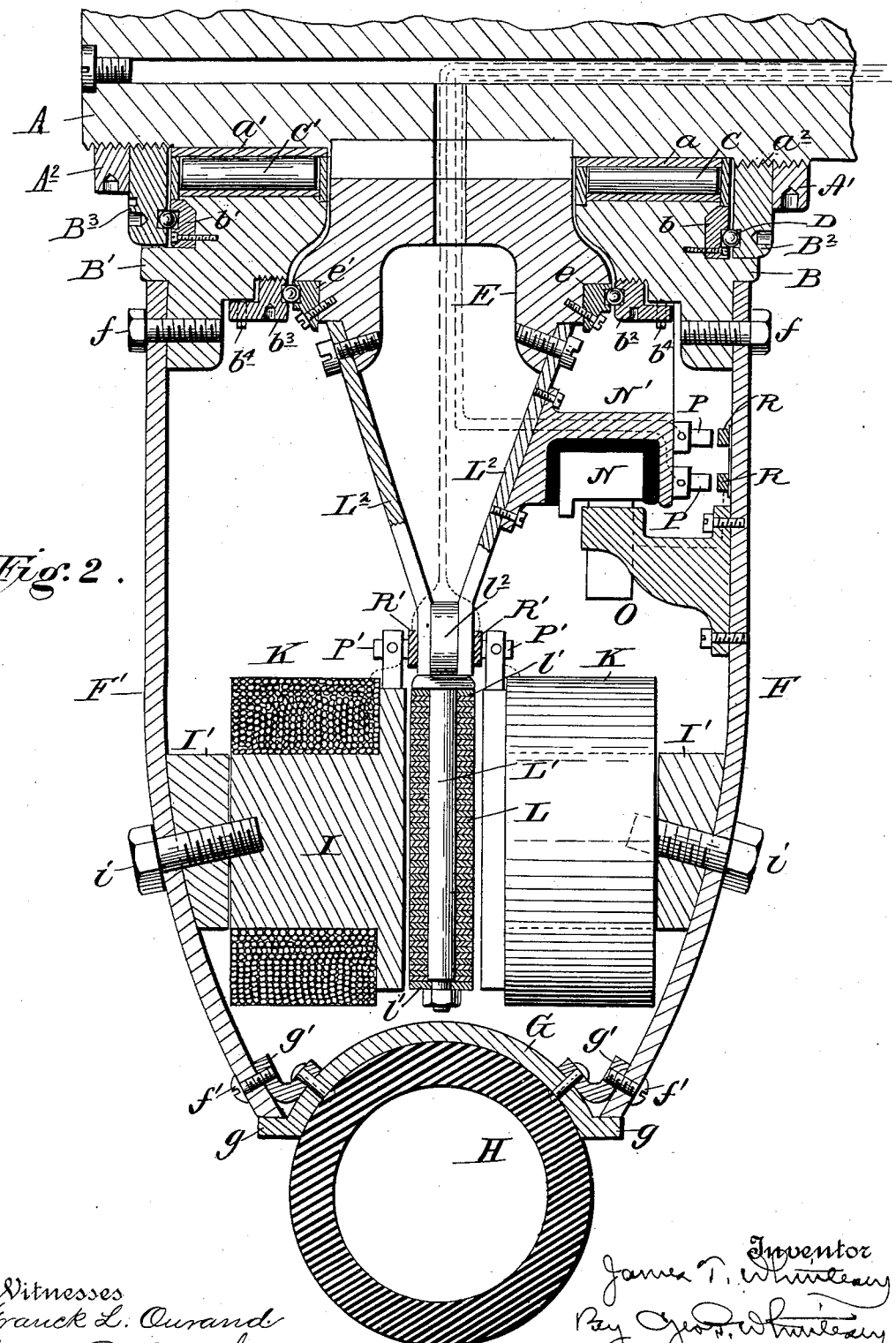
Figure 3:
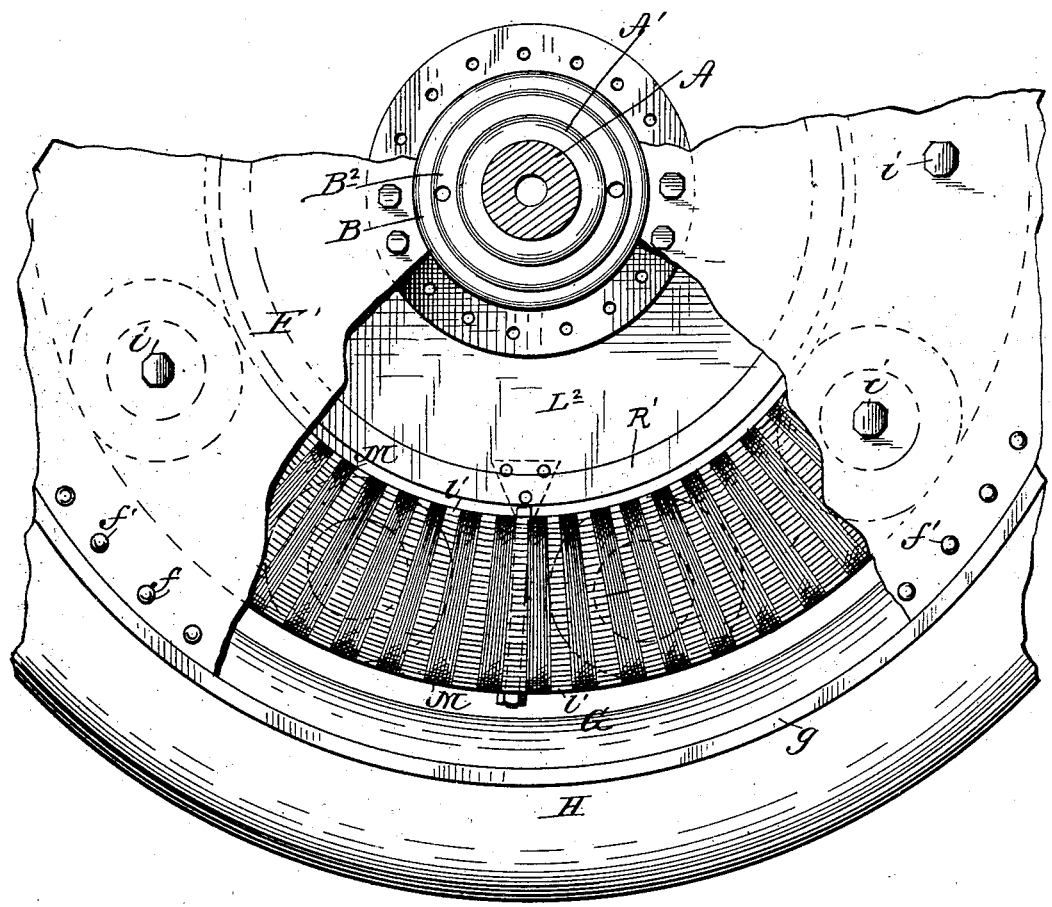
Figure 7:
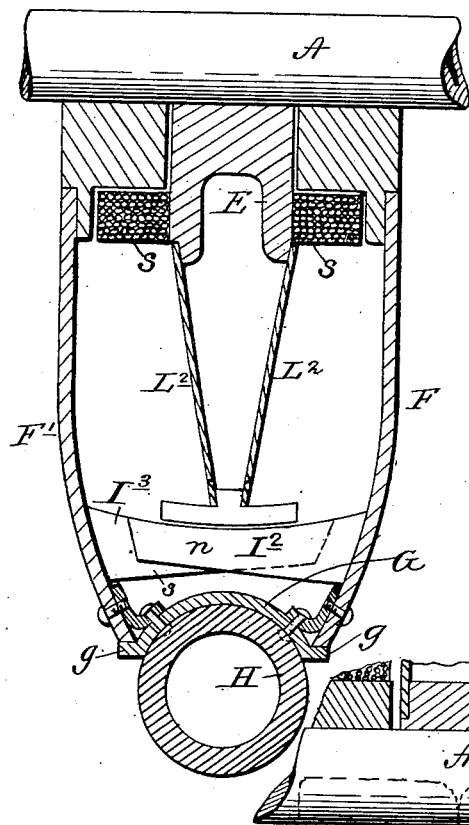
Figure 8:
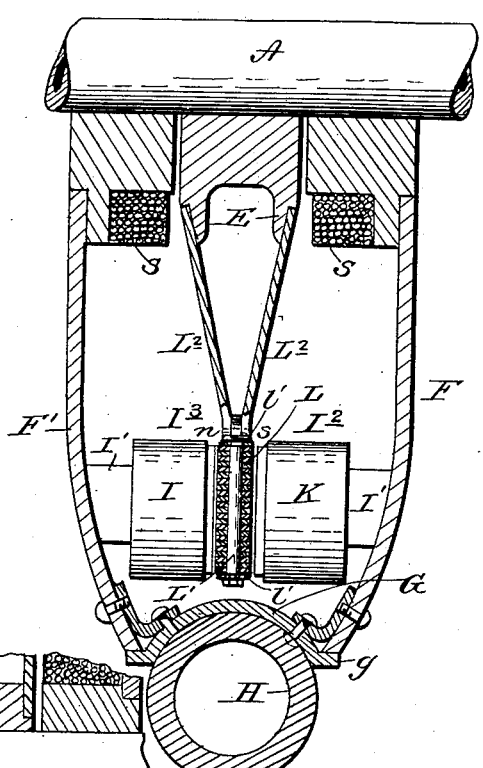
Figure 9:
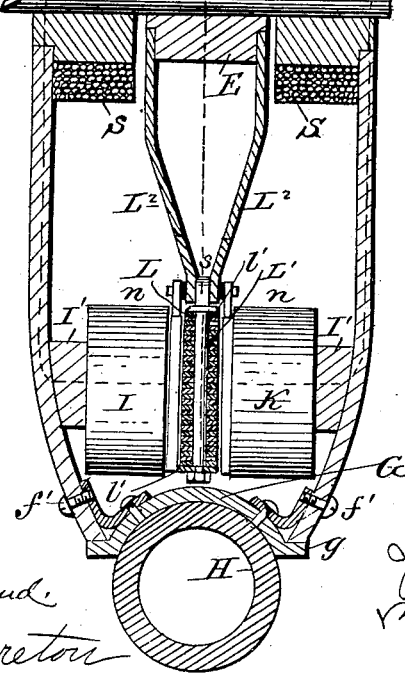

In the drawings, Figure 1 is a side elevation of an automobile carriage equipped with my motor-wheels. Fig. 2 is an axial section of half of one of my wheels. Fig. 3 is a sectional elevation, partly broken away. Fig. 4 shows a portion of the armature-core in section. Fig. 5 is a plan of one of the armature-core laminations. Fig. 6 is a diagram of the magnetic circuits. Figs. 7, 8, and 9 show modified forms of field-windings.

Briefly stated, my motor-wheel comprises a stationary axle and two hubs rotatable thereon, each carrying a dished circular plate or web converging at their peripheries to a rim or tire. One of the reacting electrodynamic elements of the motor is mounted on the inside of the webs, and the other is rigidly secured to the stationary axle between the two hubs. The details of construction will now be set forth.

The axle A is stationary, like an ordinary carriage-axle. It has cylindrical journal portions, preferably provided with bushings $a\,a'$, on which are received the hubs B B' of the rotatable portion of the motor-wheel—that is, the hubs of the wheel, properly speaking. These hubs are preferably provided with roller-bearings, the rollers C for the hub B being slightly smaller than the rollers C' of the hub B'. This is because the outer journal $a'$ is made slightly smaller than the inner journal $a$ for convenience in assembling. The inner hub B has a steel ring $b$ in its inner end, grooved to receive balls D, which are also received in a stationary grooved washer $B^2$, secured on the axle and adjustable by means of screw-threads $a^2$ and lock-nut A'. The outer hub B' is provided with a similar ball-bearing ring $b'$, coöperating with a washer $B^3$, secured by a nut $A^2$.

Between the hubs B B' a heavy collar E is keyed to the axle, having hardened ball-bearing rings $e\,e'$ in each end, coöperating with similar rings $b^2\,b^3$ in the hubs B B', respectively. These latter rings $b^2\,b^3$ are axially adjustable on their hubs, preferably being internally threaded to engage screw-threads on the hubs. A set-screw $b^4$ enables each of these rings to be locked after adjustment. By means of these rings and the washers and their nuts the hubs can be adjusted axially with reference to the stationary collar for a purpose hereinafter explained.

Secured to the hubs by screw-bolts $f$ are the annular plates or webs F F', which form the body of the wheel and also serve as a casing for the motor and as a part of the field-magnets. These webs are preferably made of heavy sheet-steel, such as boiler-plate, and they are dished, as shown, to give an arched form, enabling the wheel to resist side thrusts and twisting strains and providing ample room inside for the electrodynamic elements. The peripheries of these webs converge and are united in any manner suitable for supporting a tire, either pneumatic or otherwise. I prefer to bolt the webs to a rim or spacing-ring G, so shaped as to afford a good seat for the tire H. The ring may have flanges $g$ to receive the peripheries of the webs, which may be connected with the rim by angle-irons $g'$ and bolts $f'$.

The webs and the collar E carry, respectively, the two reacting electrodynamic elements of the motor. I prefer to arrange them as shown in the drawings, the armature being supported by the collar and the field-coils by the webs.

The cores I of the field-magnets are secured by screws $i$ to the inside of the webs F F', near their peripheries, being spaced equidistant and preferably opposite each other. They are wound with coils K, and filling-pieces I' may be used behind the coils to afford a firm bearing for their outer ends, or the core may be made solid in one piece.

The armature has a laminated annular core L, preferably built up in sections $l$, placed end to end, with the adjacent layers breaking joint. Heavier continuous plates or rings $l'$ are used on the outside and inside. The laminations are perforated to admit radial clamping-bolts L', suitably insulated. The inner ends of the bolts are enlarged into flat heads $l^2$, which are received between annular plates $L^3$, secured to the collar E. These plates diverge from the core L to the hub, so that the core is held very rigidly and immovably in a given position. The core is preferably quite thin in a direction parallel with the axle, but deep in a radial direction. It has radial grooves on the sides to receive the winding M. This is preferably a Gramme winding; but a drum or a wave winding may be used when the arrangement of the field-poles requires it. This thin deep armature stands between the opposing poles of the field-coils, as shown. The air-gap is maintained at a predetermined constant by the rigid construction of the armature-support and the stiffness of the webs; but in case it needs adjusting the hubs B B' can be shifted axially, as above set forth. A hand-hole in each web, provided with a removable cover-plate $F^2$, gives access to the rings $b^2\,b^3$ and also to the commutator, brush-holders, and contacts.

The commutator-segments N are carried on an annular bracket N', secured to one of the plates $L^3$. The brush-holders O, whose number is of course dependent upon the number of field-coils, are attached to one of the webs.

The leads from the controller come in through a duct in the stationary axle and pass up through the stationary collar E to two sets of terminals arranged on the armature-support. On the commutator-bracket are two brushes P, coöperating with the contact-rings R on the adjacent web, which are in circuit with the brushes.

Located near the armature-core are two contact-rings R', one on each side of the armature-support and coöperating with contacts P', carried on one of the field-coils and constituting the terminals of the field-circuit. The contact-rings R and the brushes which make contact with them are for the purpose of conducting the current from the battery to the armature through the brush-holders. In the usual form of motor the brush-holder is secured to a stationary field-frame and there is no need of such contact; but here the frame, which is the wheel-web, revolves, and consequently a moving contact must be provided. The rings R' are in the same way necessary to conduct the current to the field-coils. In both cases one of the leading-wires is connected to one ring. The current comes to this ring and by the contact to the armature or field-coils and back by the other contact and ring to the battery. These contacts and rings assist in some degree in preserving the constancy of the air-gap between the field-poles and the armature.

By removing the screw-bolts $f f'$ either of the webs can be taken off, giving free access to the armature, the commutator, the bearings, and all other parts.

With the field-poles arranged as shown in Fig. 6—that is, with those of like polarity opposite each other and the poles on each web alternating in polarity—the magnetic flux is from the north poles into both sides of the armature, along the armature-core in both directions to points opposite the adjacent south poles on each side, thence through the cores of those field-coils to the web of the wheel, and back through the web to the north poles, as indicated by dotted lines in Fig. 6. If unlike poles are opposite and the poles on each web alternate, then the magnetic flux will be through the webs from pole to pole, as before, and also straight across through the armature-core and up around through the rim of the wheel. If all these poles on one web are alike and of opposite polarity to those on the other web, the magnetic flux will be straight across through the armature and up through the webs to the rim, and so around back again. In these last two cases, where the flux is across through the armature, a drum or wave winding must be used on the armature. As these involve a good deal of "dead" wire, I prefer the plain Gramme winding and like field-poles facing each other, as shown in Fig. 6.

When all the poles on one side are of the same polarity, the effect is that of a spherical field, and this can be attained more simply and with a less weight of wire by the modifications shown in Fig. 7 and 8. Here the field-coils S are wound on the hubs B B' or on tubular extensions of the collar E. The two coils constitute, in magnetic effect, but one coil, and the magnetic flux is through the hubs and collar, radially outward in one web, through the pole-pieces $I^2$, into and through the armature to the pole-pieces $I^3$, and radially inward to the hub. If the pole-pieces are arranged to project alternately over the armature, as shown in Fig. 7, then a Gramme-ring winding can be used, the armature-core being wide and shallower than the thin deep core shown in Fig. 8, which must carry a drum or wave winding.

Another modification is shown in Fig. 9, where the two coils are wound in opposite directions, giving like poles on both webs and an opposite pole in the armature-core, the magnetic flux being not only radially through the webs, but also radially through the plates L. In this form a Gramme-ring winding can be used on a thin deep armature-core.

In all these modifications possible polarities are indicated by the letters $n\ s$. It will be noted that in every instance the webs are an essential part of the magnetic circuit, and by utilizing them to carry the magnetic flux I do away with heavy field-magnet frame and cores and make the motor-wheel much lighter and more compact, besides having more space for the operating parts inside the webs.

Having thus described my invention, what I claim, and desire to secure by Letters Patent, is—

1. An electric-motor wheel for vehicles, comprising a stationary axle, two hubs rotatably mounted thereon, a web secured to each hub, a wheel-tire carried on the peripheries of the webs, a stationary electrodynamic element secured to the axle between the two hubs, and moving electrodynamic elements secured to the inside of both webs near the peripheries thereof and in proximity to and at opposite sides of said stationary element, and means for adjusting the air-gap between said opposing elements and the stationary element lying between them.

2. An electric-motor wheel for vehicles, comprising a stationary axle, a stationary electrodynamic element secured to said axle, two hubs one on each side of said element, webs secured to said hubs, a tire carried on the peripheries of said webs, moving electrodynamic elements secured to said webs on each side of the stationary element, and means for axially adjusting the hubs in order to maintain the proper alinement of the parts and a predetermined air-gap between the stationary and the moving electrodynamic elements.

3. In an electric-motor wheel, the combination with a stationary axle, of a stationary collar secured thereto, and carrying one element of the motor, two hubs rotatably mounted on the axle, one on each side of the stationary collar and carrying the other element of the motor, an annular bearing in each end of the stationary collar, a corresponding annular bearing in the adjacent ends of the rotatable hubs, and means for axially adjusting said latter bearings in order to regulate the relative axial positions of the stationary collar and the rotatable hubs.

4. In an electric-motor wheel, the combination with a stationary axle, of a collar rigidly secured thereto, two rotatable hubs one on each side of said collar, a ball-bearing ring in each end of the collar, a screw-threaded section on the adjacent end of each hub, an internally-screw-threaded ball-bearing ring engaging said screw-threaded section, and reacting electrodynamic elements carried by the collar and the hubs, respectively.

5. In an electric-motor wheel, the combination with a stationary axle, of a collar rigidly secured thereto, annular plates secured to said collar, and converging at their peripheries, and an annular armature-core, concentric with and secured to the outer edges of said plates.

6. In an electric-motor wheel, the combination with a stationary axle, of a collar rigidly secured thereto, annular plates secured to said collar and converging at their peripheries, an annular laminated armature-core, and radial clamping-bolts for said core, having wide heads received between and secured to said plates.

7. In an electric-motor wheel, the combination with a stationary axle, of an armature-support rigidly secured thereto, a thin deep armature, a contact-ring on each side of said support near the armature, rotatable wheel-webs carrying field-coils facing opposite sides of the armature, and a contact on one of the coils on each side, bearing against the adjacent contact-ring, and in circuit with the field-coils.

8. In an electric-motor wheel, the combination with a stationary axle, of an armature-support rigidly secured thereto, an annular bracket secured on one side of said support, a commutator on said bracket, contact-brushes secured to said bracket, rotatable wheel-webs, brush-holders on one of said webs, and contact-rings on said web bearing against said contact-brushes on the commutator-bracket.

9. An electric-motor wheel, having two metallic webs forming the body of the wheel, and constituting an essential part of the magnetic circuit through the reacting field-poles and armature.

10. An electric-motor wheel, comprising a stationary axle, a stationary electrodynamic element secured thereto, two dished webs rotatable on the axle and inclosing said stationary element, and a second electrodynamic element having pole-pieces carried on said webs, adjacent to said stationary element, said webs constituting an essential part of the magnetic circuit.

In testimony whereof I affix my signature in presence of two witnesses.

JAMES THOMAS WHITTLESEY.

Witnesses:
GEO. H. ANGER,
C. E. PEARCE.